US012037961B1

(12) United States Patent
Ness et al.

(10) Patent No.: US 12,037,961 B1
(45) Date of Patent: Jul. 16, 2024

(54) PISTON OPTIMIZED FOR COMBUSTION FLAME SPEED AND COMPRESSION RATIO IN ENGINE SYSTEM

(71) Applicant: Caterpillar Inc., Peoria, IL (US)

(72) Inventors: Aaron Ness, Battle Ground, IN (US); Andrew J. Loetz, West Lafayette, IN (US); Adam J. Clute, Lafayette, IN (US); Sri Harsha Uddanda, Cypress, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/352,019

(22) Filed: Jul. 13, 2023

(51) Int. Cl.
*F02B 3/00* (2006.01)
*F02F 3/26* (2006.01)

(52) U.S. Cl.
CPC ...................................... *F02F 3/26* (2013.01)

(58) Field of Classification Search
CPC ..... F02B 23/0672; F02B 23/0624; F02F 3/26; F02F 3/28
USPC ....................................................... 123/193.6
See application file for complete search history.

(56) References Cited

U.S. PATENT DOCUMENTS 4,955,338 A 9/1990 Diwakar et al.
5,000,132 A 3/1991 Takashima
5,535,716 A 7/1996 Sato et al.
7,243,862 B2 7/2007 Dingle
9,429,101 B2 * 8/2016 Nacke ........................ F02F 3/26
9,670,829 B2 6/2017 Böwing et al.
10,294,876 B2 5/2019 Laget et al.
10,815,871 B2 10/2020 Saad et al.
2005/0166890 A1 8/2005 Wickman
2012/0160205 A1 * 6/2012 Gladden ............. F02B 23/0696 123/193.6
2013/0032120 A1 * 2/2013 Claver .................... F02F 3/022 29/888.074
2014/0331961 A1 * 11/2014 Ness ................... F02B 23/0651 123/294
2015/0053167 A1 * 2/2015 Nacke ........................ F02F 3/26 123/193.6
2015/0068487 A1 * 3/2015 Bowing .................. F02B 23/08 123/193.6
2017/0122248 A1 * 5/2017 Azevedo .................... F16J 9/12
2019/0186341 A1 * 6/2019 Ness ................... F02B 23/0621

FOREIGN PATENT DOCUMENTS

EP 0775810 A1 5/1997
EP 2063081 B 8/2016
FR 2880385 A 7/2006
(Continued)

*Primary Examiner* — Long T Tran
*Assistant Examiner* — James J Kim
(74) *Attorney, Agent, or Firm* — Brannon Sowers & Cracraft PC

(57) ABSTRACT

A piston for an internal combustion engine includes a piston skirt and a piston crown attached to the piston skirt and including a combustion face. The combustion face forms a piston rim and a combustion bowl. A bowl edge defines an intersection of the combustion bowl and the piston rim, and a reentrant surface defining a reentrancy angle extends between the bowl edge and a bowl outer wall. A ratio of a bowl depth dimension coincident with the piston center axis to a compression height dimension coincident with the piston center axis is from about 0.30 to about 0.35.

17 Claims, 2 Drawing Sheets

(56) References Cited

FOREIGN PATENT DOCUMENTS

| | | | |
|---|---|---|---|
| IN | 201621045122 | A | 12/2019 |
| JP | H04128540 | A | 4/1992 |
| JP | 2001065350 | A | 3/2001 |

* cited by examiner

PISTON OPTIMIZED FOR COMBUSTION FLAME SPEED AND COMPRESSION RATIO IN ENGINE SYSTEM

TECHNICAL FIELD

The present disclosure relates generally to a piston for an internal combustion engine, and more particularly to a piston having features proportioned for enhanced flame speed and compression ratio.

BACKGROUND

Internal combustion engines are widely used throughout the world for purposes ranging from vehicle propulsion to operation of pumps and compressors, to generation of electrical power. Typical internal combustion engines employ a plurality of pistons that reciprocate in cylinder bores to rotate a crankshaft in response to a controlled combustion reaction producing a rapid pressure and temperature rise to drive the pistons. For decades engineers have experimented with a wide variety of different fuels, various exhaust treatment apparatuses and technologies, and different operating strategies in efforts to improve engine operation, reliability, and performance.

In recent years considerable engineering resources have been directed at developing pistons optimized for various applications. Depending upon engine type, a piston is commonly formed with a specified combustion face geometry intended to interact with flows of fuel, air, and/or exhaust during operation to various ends including optimizing emissions and/or efficiency, to mitigate or otherwise control in-cylinder temperatures and/or mechanical wear or corrosion, and for various other purposes. It has been observed that oftentimes seemingly quite minor changes to piston geometry can have outsized effects upon engine operation and performance, and the results of toggling any one variable respecting piston geometry can often be quite unpredictable. Moreover, compounding the difficulties in optimizing piston design, the addition or removal of piston volume, particularly upon the combustion face, affects geometric compression ratio, oftentimes requiring other modifications to piston or overall engine and supporting system design to maintain compression ratio at a desired level. Depending upon fuel type and a great many different operating parameters and different engine applications, optimized piston designs can have widely varying geometries. One known piston is set forth in U.S. Pat. No. 9,670,829 to Bowing et al.

SUMMARY

In one aspect, a piston for an internal combustion engine includes a piston skirt having a wrist pin bore formed therein and defining a wrist pin axis, and a piston crown having a combustion face forming a piston rim extending circumferentially around a piston center axis, and a combustion bowl having a bowl floor extending radially outward of the piston center axis to a bowl outer wall. The combustion face further includes a bowl edge defining an intersection of a combustion bowl and the piston rim, and a reentrant surface extending between the bowl edge and the bowl outer wall. A bowl depth dimension coincident with the piston center axis is defined between the piston rim and the bowl floor, and a compression height dimension coincident with the piston center axis is defined between the piston rim and the wrist pin axis. A ratio of the bowl depth dimension to the compression height dimension is from about 0.30 to about 0.35.

In another aspect, a piston for an internal combustion engine includes a piston skirt having a wrist pin bore formed therein and defining a wrist pin axis, and a piston crown including a combustion face forming a piston rim extending circumferentially around a piston center axis, and a combustion bowl. The combustion face further includes a bowl edge defining an intersection of the combustion bowl and the piston rim, and a reentrant surface defining a bowl reentrancy angle. The combustion bowl has a U-shaped profile, axially below the reentrant surface, relative to the piston center axis, in a plane including the piston center axis. A ratio of a bowl depth dimension coincident with the piston center axis to a compression height dimension coincident with the piston center axis is 0.3 or greater.

In still another aspect, an internal combustion engine system includes an engine housing having a cylinder bore formed therein, an engine head, and a piston movable within the cylinder bore between a bottom-dead-center (BDC) position and a top-dead-center (TDC) position. The piston includes a piston skirt having a wrist pin bore formed therein and defining a wrist pin axis, and a piston crown including a combustion face forming a piston rim extending circumferentially around a piston center axis, and a reentrant combustion bowl. A ratio of a bowl depth dimension coincident with the piston center axis to a compression height dimension coincident with the piston center axis is from about 0.30 to about 0.35.

DETAILED DESCRIPTION

Figure 1:
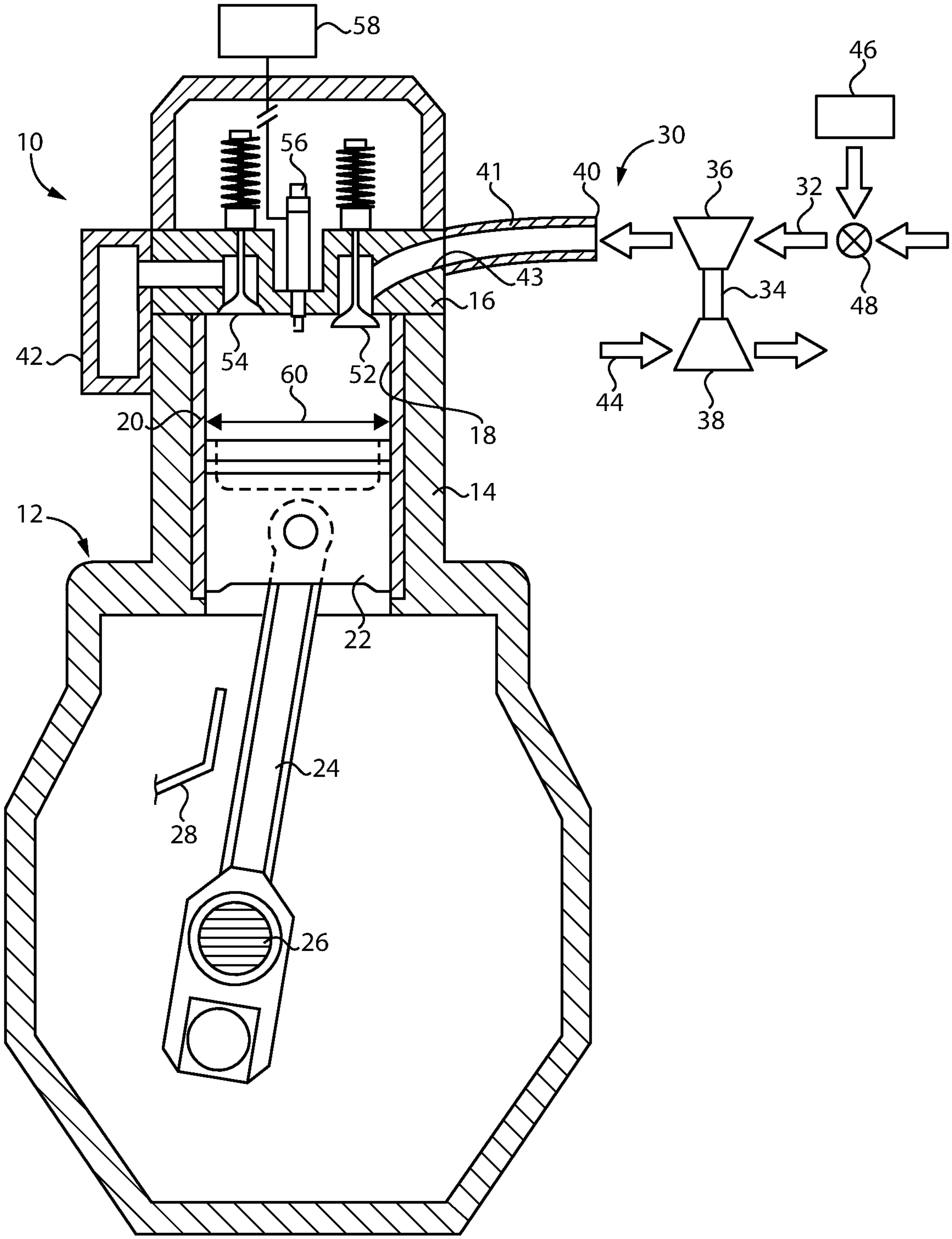
FIG. 1 is a diagrammatic view of an internal combustion engine system, according to one embodiment.

Referring to FIG. 1, there is shown an internal combustion engine system 10, according to one embodiment. Engine system 10 includes an internal combustion engine 12 having an engine housing or cylinder block 14, and an engine head 16 attached to cylinder block 14. A combustion cylinder 18 is formed in cylinder block 14 and may be one of a plurality of combustion cylinders formed therein. Although only a single cylinder and associated hardware is shown in FIG. 1, it will be appreciated that internal combustion engine system 10 will typically be a multi-cylinder engine and description and discussion herein of any one component of engine system 10 in the singular will be understood to refer by way of analogy to other like components of engine system 10. Combustion cylinders in cylinder block 14 may include any number in any suitable arrangement such as an in-line pattern, a V-pattern, or still another.

A cylinder liner 20 is positioned within cylinder block 14, and a piston 22 is movable in cylinder 18 between a bottom-dead-center (BDC) position and a top-dead-center (TDC) position in a generally conventional manner. Engine 12 will typically, but not necessarily, be configured to operate in a four-stroke engine cycle. Piston 22 is coupled to a connecting rod 24 in turn coupled to a crankshaft 26. An oil sprayer 28 may be oriented to spray cooling and lubricating oil onto an underside of piston 22 and into an oil gallery therein also in a generally conventional manner.

Engine system 10 also includes an intake system 30. Intake system 30 includes an intake conduit 32 structured to convey intake air for combustion to cylinder 18. Intake system 30 also includes an intake manifold 40 and an intake runner 41 extending from intake manifold 40 to an intake port 43 feeding cylinder 18. Those skilled in the art will appreciate an intake manifold would typically be coupled to a plurality of intake runners each extending to one of a plurality of cylinders. Engine system 10 also includes a turbocharger 34 having a compressor 36 positioned to pressurize an incoming flow of intake air in response to rotation of a turbine 38. Engine system 10 also includes an exhaust manifold 42 configured to receive a flow of exhaust from cylinder 18 and to convey the same by way of an exhaust conduit 44 to turbine 38.

Engine system 10 also includes a fuel admission valve 48 positioned to admit a flow of fuel from a fuel supply 46 to intake conduit 32. The illustrated arrangement will be recognized as a fumigated fuel admission arrangement. In other instances, engine system 10 might be port injected, including a fuel injection valve extending into or close to intake port 43, or manifold injected. It is contemplated engine system 10 will typically operate on a gaseous fuel, such as natural gas. Natural gas or other gaseous fuels might be supplied from a pressurized fuel tank, a gas line, from a mine, or various other sources. Engine system 10 may also be operated on various fuel blends including natural gas and gaseous molecular hydrogen, or various other gaseous hydrocarbon fuels and blends such as methane, ethane, biogas, landfill gas, or still others.

An intake valve 52 is shown supported in engine head 16 and movable to open or close fluid communications between intake port 43 and cylinder 18. An exhaust valve 54 analogously selectively fluidly connects cylinder 18 to exhaust manifold 42. In a typical application a total of two intake valves and a total of two exhaust valves might be provided for each cylinder in an engine. Engine system 10 may also be spark-ignited and includes a sparkplug 56 positioned to extend through engine head 16 into cylinder 18 to produce an electrical spark for igniting a mixture of fuel and air in cylinder 18. Sparkplug 56 may be electrically connected to an electronic control unit 58 or another suitable electrical or magnetic device for generating a spark at a spark gap in cylinder 18. Still other implementations could employ a prechamber sparkplug providing a prechamber within or fluidly connected to cylinder 18 for igniting a prechamber charge that ignites a main charge of a fuel and air in cylinder 18 according to well-known principles.

Figure 2:
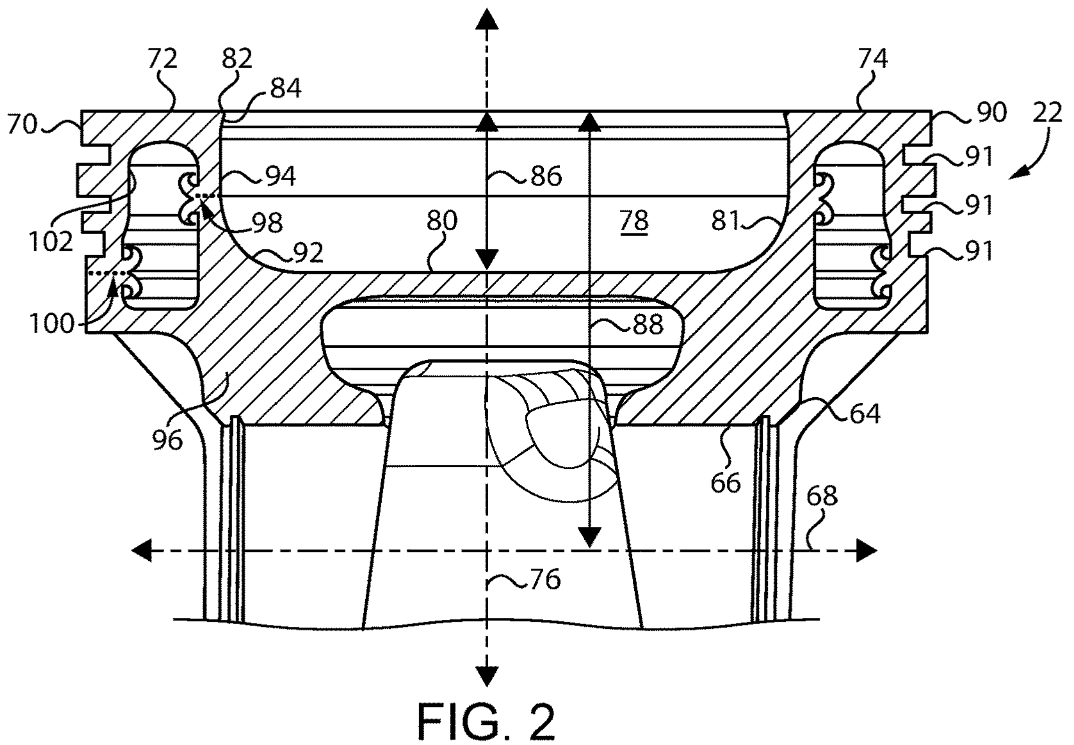
FIG. 2 is a sectioned side diagrammatic view of a piston, according to one embodiment.
Figure 3:
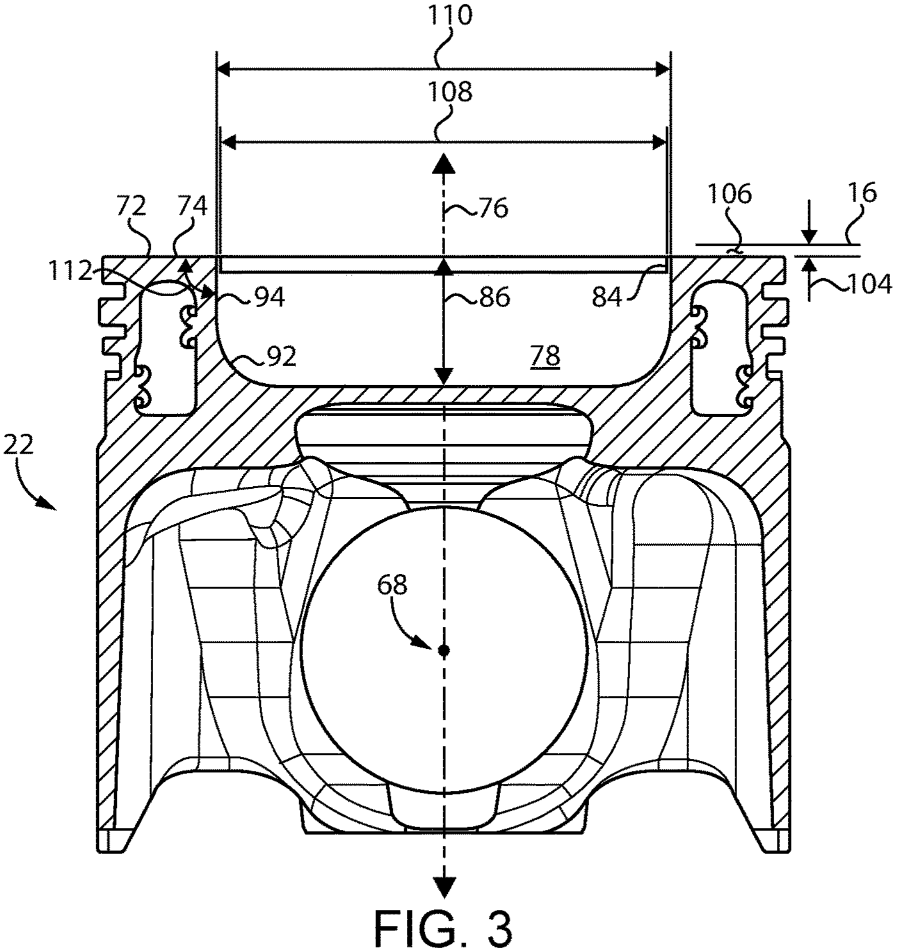
FIG. 3 is a sectioned side diagrammatic view of a piston as in FIG. 2, rotated 90 degrees from the view of FIG. 2.

Referring also now to FIGS. 2 and 3, there are shown features of piston 22 in further detail. Piston 22 includes a piston skirt 64 typically formed as part of a piston skirt portion 96 and having a wrist pin bore 66 formed therein and defining a wrist pin axis 68. Piston 22 also includes a piston crown 70 having a combustion face 72 forming a piston rim 74 extending circumferentially around a piston center axis 76, and a combustion bowl 78. Combustion bowl 78 may include a reentrant combustion bowl and has a bowl floor 80 extending radially outward of piston center axis 76 to a bowl outer wall. 81. Combustion face 72 further includes a bowl edge 82 defining an intersection of combustion bowl 78 and piston rim 74, and a reentrant surface 84 extending between bowl edge 82 and bowl outer wall 81.

In the illustrated embodiment, piston rim 74 extends planarly between a piston outer crown surface 90 and bowl edge 82. Piston outer crown surface 90 may include a plurality of piston ring grooves 91 each extending circumferentially around piston center axis 76 and configured to receive a piston ring containing fluids within cylinder 18 during service. Bowl floor 80 may extend planarly between piston center axis 76 and bowl outer wall. 81. Thus, each of piston rim 74 and bowl floor 81 may be planar and may be parallel to one another. Bowl outer wall 81 may include an arcuate surface 92 extending radially outward and axially upward from bowl floor 80, relative to piston center axis 76, and a cylindrical surface 94 extending axially upward, relative to piston center axis 74, from arcuate surface 92 and circumferentially around piston center axis 76.

Combustion bowl 78 may have a U-shaped profile, axially below reentrant surface 84, relative to piston center axis 76, in a plane including piston center axis 76. Reentrant surface 84 may extend from bowl edge 82 to cylindrical surface 94. Axially below reentrant surface 84, relative to piston center axis 76, combustion face 72 may be understood as formed by a total of three surfaces, including cylindrical surface 94, arcuate surface 92, and bowl floor 80. Combustion face 72 may have a uniform profile of rotation about piston center axis 76. Arcuate surface 92 may define a radius of curvature in the plane of the page in FIGS. 2 and 3 that is about 15 millimeters. Reentrance surface 84 may define a radius of curvature in that plane that is about 10 millimeters. A cylinder bore diameter 60 is also shown in FIG. 1. In an implementation, cylinder bore diameter 60 is about 170 millimeters.

As noted above, piston 22 is understood to have a piston skirt portion 96 that includes piston skirt 64. Piston skirt portion 96 is attached to piston crown 70, and in the illustrated embodiment may be attached by friction welding such as inertia welding or another strategy. A first weld post 98 and a second weld post 100 each extend circumferentially around piston center axis 76 and together attach piston skirt 64 to piston crown 70. An oil gallery 102 is formed in part in piston crown 70 and in part in piston skirt portion 96 and extends circumferentially around combustion bowl 78. First weld post 98 may extend from oil gallery 102 to combustion bowl 78. Those skilled in the art will recognize that in contrast to certain other piston designs a weld post extends to combustion bowl 78, whereas certain conventional pistons place a friction weld post beneath a combustion bowl.

With continued reference to the drawings generally, but focusing on FIG. 2, a bowl depth dimension 86 coincident with piston center axis 76 is defined between piston rim 74 and bowl floor 80. A compression height dimension 88 coincident with piston center axis 76 is defined between piston rim 74 and wrist pin axis 68. A ratio of bowl depth dimension 86 to compression height dimension 88 may be greater than 0.3. In a refinement, a ratio of bowl depth dimension 86 to compression height dimension 88 may be from about 0.30 to about 0.35, and in a further refinement from about 0.31 to about 0.33. In a still further refinement, the ratio of bowl depth dimension 86 to compression height dimension 88 may be about 0.32. Bowl depth dimension 86 may be about 31 millimeters and compression height dimension about 96 millimeters in certain practical implementations.

With continued reference to the drawings generally, but focusing now on FIG. 3, combustion face 72 defines a bowl opening dimension 108. Bowl opening dimension 108 can be understood as a diameter of an opening of combustion bowl 78 passing through piston center axis 76. Bowl opening dimension 108 may be about 111 millimeters in some embodiments. Combustion face 72 also defines a bowl max diameter 110 at a location of cylindrical surface 94. A reentrancy angle 112 defined as an angle subtended between reentrant surface 84 and piston rim 74 may be greater than 75 degrees, and in a practical implementation about 77 degrees.

FIG. 3 also illustrates a clearance distance 104 that may extend between piston 22 and engine head 12 when piston 22 is at the TDC position, and a clearance volume 106 defined between combustion face 72 and engine head 16. Clearance distance 104 may be about 4 millimeters. Clearance volume 106 may be about 397 cubic centimeters. A ratio of a combustion bowl volume to the clearance volume may be from about 0.70 to about 0.75. Piston 22 also defines an opening area understood as an area of a circle defined by opening dimension 108. A ratio of the bowl opening area to a clearance area defined as a sum of the bowl opening area and the piston rim area may be from about 0.38 to about 0.45. In a refinement, the ratio of the bowl opening area to the clearance area may be about 0.43. A similar ratio range may exist between the bowl opening area and a cross-sectional bore area of cylinder bore 18, albeit cylinder bore 18 may be slightly larger in cross sectional area than the sum of the bowl opening area and the piston rim area. Combustion bowl 78 may define a ratio of bowl depth dimension 86 to bowl max diameter 110 at cylindrical surface 94 of about 0.27.

INDUSTRIAL APPLICABILITY

It has been observed that increased turbulence in the flow of fluids within a combustion cylinder can be associated with enhanced combustion flame speed in at least certain instances. In a general sense, increased turbulence helps promote rapid flame speed, hastening combustion, and in some instances improving engine efficiency, performance, and emissions. In operating engine system 10 as the premixed gaseous fuel and air is compressed during a compression stroke, when piston 22 approaches the TDC position the relatively small clearance distance 104 assists in providing a relatively rapid squish of fuel and air from between piston rim 72 and engine head 16. The squished-fuel-and-air mixture flows over bowl edge 82 and, based at least in part on the reentrant profile of combustion bowl 78, produces turbulence that assists in promoting fast flame speed.

As also noted above, relatively minute changes to piston geometry can have outsized and/or unpredictable effects. Many engines are configured to operate at a relatively tightly specified compression ratio. According to the present disclosure, piston 22 may be understood to approach engine head 16 quite closely at TDC to promote a robust squish of fuel and air. Reducing clearance distance, however, other factors being equal, would affect compression ratio by reducing volume in the cylinder bore. Accordingly, combustion bowl 78 is made relatively deep to maintain a compression ratio for a given stroke distance and compression height. The dimensions and ranges of ratios disclosed herein can assist in providing a piston having a compression ratio of about 13.3:1 whilst providing for faster flame speed resulting from high-squish velocity and turbulence induced by flow into the reentrant combustion bowl.

Certain dimensions and proportions are described herein using the term "about." The term "about" can be understood to mean generally or approximately as would be understood by a person skilled in the engine and piston design field, such as by way of approximation, convention, or conventional rounding to a consistent number of significant digits. According to the latter of these, "about 0.3" is understood to mean from 0.25 to 0.34. "About 0.32" means from 0.315 to 0.324, and so on. A dimension or proportion listed without a preceding relative term can be understood to mean the dimension or proportion within measurement error.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A piston for an internal combustion engine comprising:
- a piston skirt having a wrist pin bore formed therein and defining a wrist pin axis;
- a piston crown including a combustion face forming a piston rim extending circumferentially around a piston center axis, and a combustion bowl having a bowl floor extending radially outward of the piston center axis to a bowl outer wall;
- the combustion face further having a bowl edge defining an intersection of the combustion bowl and the piston rim, a reentrant surface extending between the bowl edge and the bowl outer wall, and a cylindrical surface extending between the reentrant surface and the bowl outer wall;
- a bowl depth dimension coincident with the piston center axis is defined between the piston rim and the bowl floor, and a compression height dimension coincident with the piston center axis is defined between the piston rim and the wrist pin axis;
- a bowl max diameter dimension is defined at a location of the cylindrical surface;
- a ratio of the bowl depth dimension to the compression height dimension is from about 0.30 to about 0.35; and
- a ratio of the bowl depth dimension to the bowl max diameter dimension is less than the ratio of the bowl depth dimension to the compression height dimension.

2. The piston of claim 1 wherein the piston rim extends planarly between a piston outer crown surface and the bowl edge, and the bowl floor extends planarly between the piston center axis and the bowl outer wall.

3. The piston of claim 2 wherein the bowl outer wall includes an arcuate surface extending radially outward and axially upward from the bowl floor, relative to the piston center axis, and the cylindrical surface extending axially upward from the arcuate surface and circumferentially around the piston center axis.

4. The piston of claim 3 wherein the reentrant surface extends from the bowl edge to the cylindrical surface, and the combustion bowl defines a U-shape having a uniform profile of rotation circumferentially around the piston center axis.

5. The piston of claim 3 wherein:
- the ratio of the bowl depth dimension to the compression height dimension is about 0.32; and the combustion bowl defines a ratio of the bowl depth dimension to the bowl max diameter dimension at the cylindrical surface of about 0.27.

6. The piston of claim 5 wherein the bowl depth dimension is about 31 millimeters, and the compression height dimension is about 96 millimeters.

7. The piston of claim 1 wherein the combustion face defines a bowl opening area, and a piston rim area, and a ratio of the bowl opening area to a summed area of the bowl opening area and the piston rim area is from about 0.38 to about 0.45.

8. The piston of claim 1 further comprising a piston skirt portion including the piston skirt, and a first weld post and a second weld post together attaching the piston skirt portion to the piston crown.

9. The piston of claim 8 wherein an oil galley is formed in the piston crown and extends circumferentially around the combustion bowl, and the first weld post extends from the oil gallery to the combustion bowl and circumferentially around the piston center axis.

10. A piston for an internal combustion engine comprising:

a piston skirt having a wrist pin bore formed therein and defining a wrist pin axis;

a piston crown including a combustion face forming a piston rim extending circumferentially around a piston center axis, and a combustion bowl;

the combustion face further having a bowl edge defining an intersection of the combustion bowl and the piston rim, and a reentrant surface defining a bowl reentrancy angle;

the combustion bowl having a U-shaped profile, axially below the reentrant surface, relative to the piston center axis, in a plane including the piston center axis;

a ratio of a bowl depth dimension coincident with the piston center axis to a compression height dimension coincident with the piston center axis is defined between the piston rim and the wrist pin axis is 0.3 or greater;

an oil gallery is formed in the piston and extends circumferentially around the piston center axis;

the combustion face further includes a bowl floor, and a bowl outer wall formed by an arcuate surface extending from the bowl floor, and a cylindrical surface extending from the arcuate surface to the reentrant surface; and a bowl max diameter dimension is defined at a location of the cylindrical surface axially between an axially uppermost extremity of the oil gallery and the bowl floor; and a ratio of the bowl depth dimension to the bowl max diameter dimension is less than the ratio of the bowl depth dimension to the compression height dimension.

11. The piston of claim 10 further comprising a weld post extending from the oil gallery to the combustion bowl.

12. The piston of claim 10 wherein the piston rim extends planarly between a piston outer crown surface and the bowl edge, and the bowl floor extends planarly between the piston center axis and the bowl outer wall, and the ratio of the bowl depth dimension to the compression height dimension is from 0.31 to 0.33.

13. The piston of claim 10 wherein the combustion face defines a bowl opening area, and a piston rim area, and a ratio of the bowl opening area to a summed area of the bowl opening area and the piston rim area is from 0.38 to 0.45.

14. The piston of claim 13 wherein the ratio of the bowl opening area to the summed area is about 0.43.

15. An internal combustion engine system comprising:

an engine housing having a cylinder bore formed therein;

an engine head;

a piston movable within the cylinder bore between a bottom-dead-center (BDC) position and a top-dead-center (TDC) position;

the piston including a piston skirt having a wrist pin bore formed therein and defining a wrist pin axis, and a piston crown including a combustion face forming a piston rim extending circumferentially around a piston center axis, and a reentrant combustion bowl;

a ratio of a bowl depth dimension coincident with the piston center axis to a compression height dimension coincident with the piston center axis is from about 0.30 to about 0.35; and a clearance volume is defined between the combustion face and the engine head at the TDC position, and a ratio of a combustion bowl volume to the clearance volume is from about 0.70 to about 0.75.

16. The engine system of claim 15 wherein the ratio of the combustion bowl volume to the clearance volume is about 0.71.

17. The engine system of claim 15 wherein the piston rim extends planarly between a piston outer crown surface and the bowl edge, and a ratio of a bowl opening area of the combustion bowl to a bore area of the cylinder bore is from 0.38 to 0.45.

* * * * *